(12) United States Patent
Chang et al.

(10) Patent No.: US 9,274,354 B2
(45) Date of Patent: Mar. 1, 2016

(54) POLARIZATION CONTROL DEVICE AND METHOD

(71) Applicant: Electronics and Telecommunications Research Institute, Daejeon (KR)

(72) Inventors: Sun Hyok Chang, Daejeon (KR); Hwan Seok Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 28 days.

(21) Appl. No.: 14/090,707

(22) Filed: Nov. 26, 2013

(65) Prior Publication Data

US 2014/0294333 A1   Oct. 2, 2014

(30) Foreign Application Priority Data

Mar. 27, 2013   (KR) ........................ 10-2013-0033046

(51) Int. Cl.
  *G02B 6/10*    (2006.01)
  *G02F 1/01*    (2006.01)
(52) U.S. Cl.
  CPC .................................... *G02F 1/0136* (2013.01)
(58) Field of Classification Search
  CPC .................................... G02B 6/10; G02B 6/00
  USPC ....................................... 385/2, 40
  See application file for complete search history.

(56) References Cited

U.S. PATENT DOCUMENTS

| | | | | |
|---|---|---|---|---|
| 4,691,984 | A | * | 9/1987 | Thaniyavarn ...................... 385/8 |
| 4,752,120 | A | * | 6/1988 | Shimizu ....................... 359/239 |
| 4,915,503 | A | * | 4/1990 | Pavlath ........................ 356/460 |
| 4,960,319 | A | * | 10/1990 | Dankowych ...................... 385/1 |
| 5,253,309 | A | * | 10/1993 | Nazarathy et al. ................. 385/4 |
| 6,665,106 | B2 | | 12/2003 | Noe |
| 6,678,430 | B1 | * | 1/2004 | Noe et al. ........................ 385/11 |
| 6,678,431 | B2 | | 1/2004 | Han et al. |
| 8,045,856 | B2 | | 10/2011 | Shen et al. |
| 2003/0175034 | A1 | * | 9/2003 | Noe ............................... 398/152 |
| 2013/0209021 | A1 | * | 8/2013 | Hayashi et al. .................... 385/2 |
| 2014/0294333 | A1 | * | 10/2014 | Chang et al. ...................... 385/2 |

FOREIGN PATENT DOCUMENTS

KR   10-2003-0070225 A   8/2003

* cited by examiner

*Primary Examiner* — Kaveh C Kianni

(74) *Attorney, Agent, or Firm* — Rabin & Berdo, P.C.

(57) ABSTRACT

A polarization control device in accordance with an exemplary embodiment of the present invention may include a first polarization converter for converting a polarization angle of an input optical signal in response to first control voltages, a second polarization converter for converting a polarization angle of an input optical signal in response to second control voltages, and a third polarization converter for converting an optical signal received from the first polarization converter or the second polarization converter into a first output optical signal having a linear polarization state and outputting the first output optical signal.

18 Claims, 10 Drawing Sheets

POLARIZATION CONTROL DEVICE AND METHOD

CROSS-REFERENCE TO RELATED APPLICATION

This application claims priority to and the benefit of Korean Patent Application No. 10-2013-0033046 filed in the Korean Intellectual Property Office on Mar. 27, 2013, the entire contents of which are incorporated herein by reference.

BACKGROUND OF THE INVENTION (a) Field of the Invention

The present invention relates to a polarization control device and method and, more particularly, to a polarization control device and method using a polarization converter.

(b) Description of the Related Art

An optical fiber has an advantageous characteristic in terms of high-speed and long-distance transmission of a signal because it has a small transmission loss and can transfer a wideband signal as compared with a cable or a coaxial cable using a copper wire. Furthermore, an optical fiber is used a lot in photosensors in addition to optical communication because the connection of an optical signal to the optical fiber is easy and simple. Polarization is one of the characteristics of an optical signal, and a polarization state (e.g., a shape of polarization or an angle of polarization) of an optical signal passing through an optical fiber is changed by birefringence within the optical fiber. The amount of birefringence within an optical fiber is changed by a change of temperature, pressure, or bending. The amount of birefringence within an optical fiber is small, but the direction of birefringence within an optical fiber is not regular and the amount of birefringence within an optical fiber is changed by its location. A polarization-maintaining optical fiber designed to maintain its polarization state by intentionally increasing birefringence within the optical fiber has been developed, but is not used a lot. Since an optical fiber used in optical communication or photosensors has specific birefringence and the optical fiber is changed over time as described above, an output polarization state of the optical fiber is also changed over time when an optical signal passes through the optical fiber.

Meanwhile, in an optical communication or photosensor system using the polarization characteristic of an optical signal, a polarization state of a received optical signal needs to be maintained regularly. If a polarization state is not maintained regularly, the amount of a received signal can decrease or disappear because the polarization state is changed.

SUMMARY OF THE INVENTION

The present invention has been made in an effort to provide a polarization control device and method having an advantage of regularly maintaining a polarization state of an optical signal in an optical communication system (or photosensor system).

An exemplary embodiment of the present invention provides a polarization control device. The polarization control device includes: a first polarization converter for converting a polarization angle of an input optical signal in response to first control voltages; a second polarization converter for converting a polarization angle of an input optical signal in response to second control voltages; a third polarization converter for converting an optical signal received from the first polarization converter or the second polarization converter into a first output optical signal having a linear polarization state and outputting the first output optical signal; a polarization unit for controlling power of the first output optical signal; a photodetector for detecting power of the optical signal received from the polarization unit and outputting a feedback signal corresponding to the detected power; and a controller for controlling intensity of the first control voltages or the second control voltages in response to the feedback signal and resetting the first control voltages or the second control voltages when the first control voltages or the second control voltages reach a threshold value.

Another embodiment of the present invention provides a polarization control device. The polarization control device includes: N (N≥2) first polarization converters each based on a lithium niobate (LiNb0$_3$) wave guide and configured to perform a conversion operation on a polarization angle of an input optical signal in response to control voltages; a second polarization converter configured to convert an optical signal received from the first polarization converters into a first output optical signal having a linear polarization state and output the first output optical signal; a polarization divider configured to divide the first output optical signal into a 2-1 output optical signal and a 2-2 output optical signal having polarization states perpendicular to each other; a first photodetector configured to detect power of the 2-1 output optical signal and output a first feedback signal corresponding to the detected power; and a controller configured to control intensity of the control voltages in response to the first feedback signal and reset the control voltages when the control voltages reach a threshold value. Here, when the control voltages applied to an $A^{th}$ (N>A≥1) first polarization converter of the N first polarization converters are reset, the $A^{th}$ first polarization converter stops its conversion operation and an $(A+1)^{th}$ first polarization converter performs its conversion operation.

Yet another embodiment of the present invention provides a polarization control method. The polarization control method includes: performing, by a first polarization converter, a conversion operation on a polarization angle of an input optical signal in response to first control voltages, converting the converted optical signal into a first output optical signal having a linear polarization state using third control voltages that are fixed DC voltages, controlling power of the first output optical signal, detecting the controlled power of the first output optical signal and outputting a feedback signal corresponding to the detected power, controlling intensity of the first control voltages in response to the feedback signal and repeating the steps, and resetting the first control voltages, stopping the conversion operation of the first polarization converter, and performing, by a second polarization converter, a conversion operation on a polarization angle of an input optical signal in response to second control voltages when the first control voltages reach a first threshold value.

BRIEF DESCRIPTION OF THE DRAWINGS

FIG. 6A shows a change of the first control voltages $V_{1-A}$ and $V_{1-C}$ applied to the first polarization converter 110, and FIG. 6B shows a change of the second control voltages $V_{2-A}$ and $V_{2-C}$ applied to the second polarization converter 120.

DETAILED DESCRIPTION OF THE EMBODIMENTS

Figure 1:
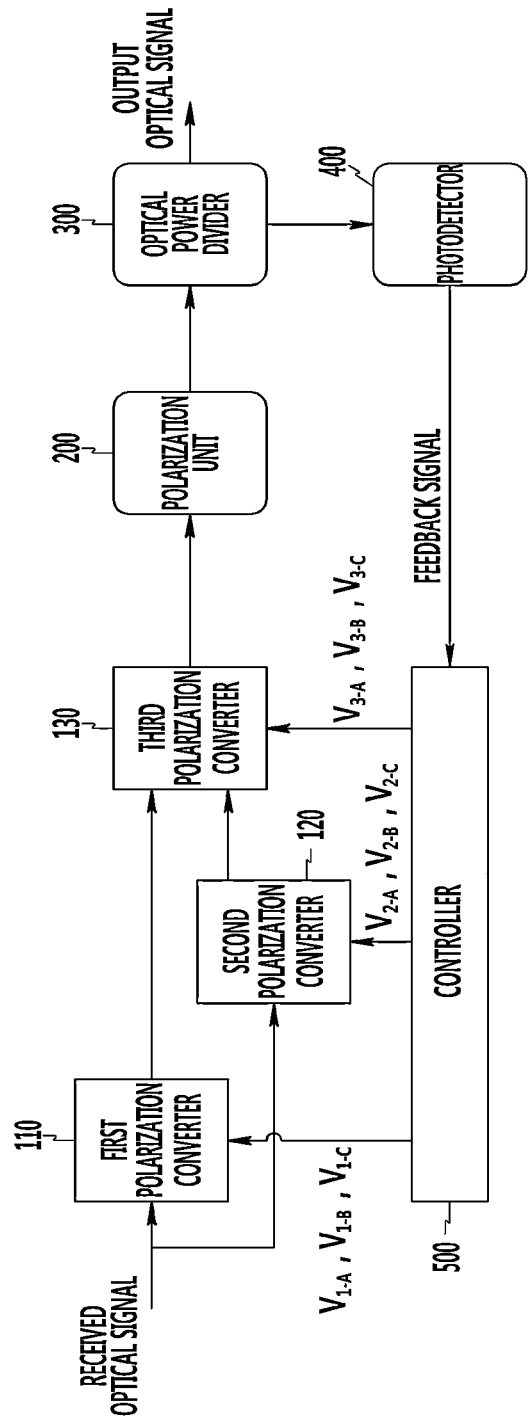
FIG. 1 is a diagram showing a polarization control device in accordance with a first exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

FIG. 1 is a diagram showing a polarization control device in accordance with a first exemplary embodiment of the present invention.

The polarization control device includes a first polarization converter 110, a second polarization converter 120, a third polarization converter 130, a polarization unit 200, an optical power divider 300, a photodetector 400, and a controller 500.

Figure 2:
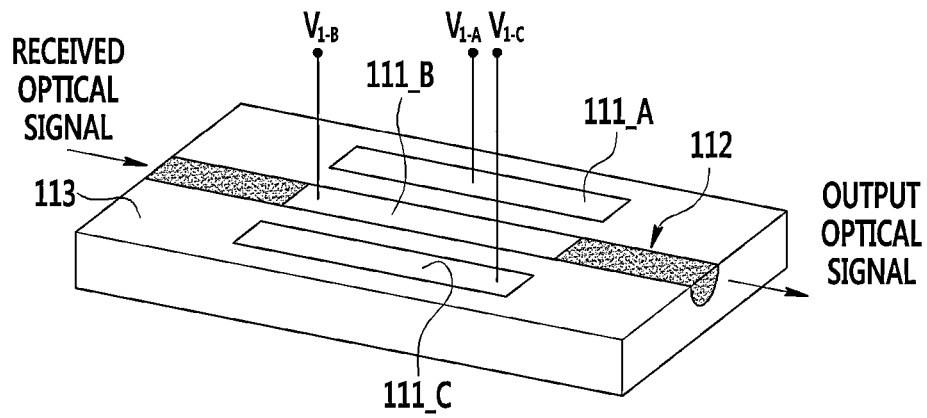
FIG. 2 is a diagram showing the structure of a lithium niobate (LiNb0$_3$) polarization converter.

The first polarization converter 110 performs a conversion operation on a polarization angle of an input optical signal in response to first control voltages $V_{1-A}$, $V_{1-B}$, and $V_{1-C}$. More particularly, the first polarization converter 110 can be configured using a polarization converter based on a lithium niobate ($LiNbO_3$) wave guide (hereinafter, a "lithium niobate polarization converter"). The lithium niobate polarization converter can perform high-speed polarization control because it has a fast operating speed and a stable operation. The structure of the first polarization converter 110, that is, the lithium niobate polarization converter, is illustrated in FIG. 2. The input optical signal passes through a wave guide 112 formed on a lithium niobate substrate 113. First to third electrodes 111_A, 111_B, and 111_C are formed on the wave guide 112, and the 1-A control voltage $V_{1-A}$, the 1-B control voltage $V_{1-B}$, and the 1-C control voltage $V_{1-C}$ are applied to the first to third electrodes 111_A, 111_B, and 111_C, respectively. The amount of birefringence of the wave guide 112 is changed by a change of the amounts of the first control voltages $V_{1-A}$, $V_{1-B}$, and $V_{1-C}$, and a polarization state of an output optical signal can be changed using the changed birefringence.

The second polarization converter 120 performs a conversion operation on a polarization angle of an input optical signal in response to second control voltages $V_{2-A}$, $V_{2-B}$, and $V_{2-C}$. More particularly, the second polarization converter 120 can be configured using a lithium niobate polarization converter like the first polarization converter 110. Meanwhile, the first polarization converter 110 and the second polarization converter 120 alternately operate. More particularly, when the first polarization converter 110 performs its conversion operation, the second polarization converter 110 does not perform its conversion operation. When the conversion operation of the first polarization converter 110 is stopped after a reset process, the conversion operation of the second polarization converter 110 is performed.

The third polarization converter 130 converts an optical signal, received from the first polarization converter 110 or the second polarization converter 120, into an optical signal having a linear polarization state and outputs the optical signal having a linear polarization state. More particularly, the third polarization converter 130 can be configured using a lithium niobate polarization converter like the first polarization converter 110. The third polarization converter 130 converts the polarization state of the optical signal into the linear polarization state using third control voltages $V_{3-A}$, $V_{3-B}$, and $V_{3-C}$, that is, fixed DC voltages.

The polarization unit 200 filters the optical signal of the third polarization converter 130 (hereinafter, a "first output optical signal") as its unique polarization state. In general, the polarization unit 200 is linear polarizer, and the optical signal passing through the polarization unit 200 has a linear polarization state. If a polarization state of the first output optical signal inputted to the polarization unit 200 is not matched with a unique polarization state of the polarization unit 200, the optical power of the first output optical signal is attenuated depending on the degree of the dislocation. More particularly, the power of the first output optical signal is controlled depending on a unique polarization angle of the polarization unit 200 and a polarization angle of the first output optical signal inputted to the polarization unit 200.

The optical power divider 300 divides the power of the optical signal, received from the polarization unit 200, in a specific ratio and outputs part of the divided power to the photodetector 400.

The photodetector 400 detects the power of the optical signal received from the optical power divider 300 and outputs a feedback signal corresponding to the detected power. If the first to third polarization converters 110 to 130 do not operate, the optical power of an optical signal passing through the polarization unit 200 is changed by a change in the polarization state of an input optical signal. The photodetector 400 changes the changing optical power into a feedback signal, that is, an electrical signal.

The controller 500 controls the first control voltages $V_{1-A}$, $V_{1-B}$, and $V_{1-C}$ in response to the feedback signal, applies the controlled first control voltages $V_{1-A}$, $V_{1-B}$, and $V_{1-C}$ to the first polarization converter 110, controls the second control voltages $V_{2-A}$, $V_{2-B}$, and $V_{2-C}$ in response to the feedback signal, and applies the controlled second control voltages $V_{2-A}$, $V_{2-B}$, and $V_{2-C}$ to the second polarization converter 120. Meanwhile, when the first control voltages $V_{1-A}$, $V_{1-B}$, and $V_{1-C}$ reach a threshold value, the controller 500 resets the first control voltages $V_{1-A}$, $V_{1-B}$, and $V_{1-C}$ to a value that satisfies a specific condition (i.e., a condition that an angle or shape of polarized light maintains a previous angle or shape). When the second control voltages $V_{2-A}$, $V_{2-B}$, and $V_{2-C}$ reach a threshold value, the controller 500 resets the second control voltages $V_{2-A}$, $V_{2-B}$, and $V_{2-C}$ to a value that satisfies a specific condition. If the controller 500 controls the first to third control voltages $V_{1-A}$, $V_{1-B}$, and $V_{1-C}$, $V_{2-A}$, $V_{2-B}$, and $V_{2-C}$, and $V_{3-A}$, $V_{3-B}$, and $V_{3-C}$ so that the feedback signal of the photodetector 400 becomes a maximum or minimum, an optical signal outputted from the optical power divider 300 has a constant optical power. This means that the first output optical signal maintains a constant polarization state. That is, if the controller 500 controls the first to third control voltages $V_{1-A}$, $V_{1-B}$, and $V_{1-C}$, $V_{2-A}$, $V_{2-B}$, and $V_{2-C}$, and $V_{3-A}$, $V_{3-B}$, and $V_{3-C}$ so that a polarization state of the first output optical signal is parallel or perpendicular to a unique polarization state of the polarization unit 200, the optical power of an optical signal outputted from the optical power divider 300 maintains a maximum or minimum, so that the first output optical signal maintains a constant polarization state.

If there is no polarization in the first and the second polarization converters 110 and 120, the output (i.e., feedback signal) of the photodetector 400 continues to be changed as a polarization state of an input optical signal is changed. Here, if the controller 500 controls the first to third polarization converters 110 to 130 so that the feedback signal of the photodetector 400 has a minimum value or a maximum value, an optical signal outputted from the optical power divider 300 has a constant polarization state.

An operation of controlling the first control voltages $V_{1-A}$, $V_{1-B}$, and $V_{1-C}$ applied to the first polarization converter 110 is described below. It is hereinafter assumed that the operation is performed so that the feedback signal of the photodetector 400 has a minimum value, for convenience of description.

As in Equation 1, the 1-A control voltage $V_{1-A}$ and the 1-C control voltage $V_{1-C}$ are controlled using a change P in the output of the photodetector 400 after each of the 1-A control voltage $V_{1-A}$ and the 1-C control voltage $V_{1-C}$ is dithered.

$$V_{1-A} + dV \cdots \blacktriangleright P_{A+}$$
$$V_{1-A} = dV \cdots \blacktriangleright P_{A-} \Longrightarrow V_{1-A} \leftarrow \quad \text{(Equation 1)}$$
$$V_{1-A} + \mu * (P_{A+} - P_{A-})/(2*dV)$$

$$\therefore$$

$$V_{1-C} + dV \cdots \blacktriangleright P_{C+}$$
$$V_{1-C} - dV \cdots \blacktriangleright P_{C-} \Longrightarrow V_{1-C} \leftarrow$$
$$V_{1-C} + \mu * (P_{C+} - P_{C-})/(2*dV)$$

First, an output value $P_{A+}$ of the photodetector 400 when the 1-A control voltage $V_{1-A}$ is increased by dV is calculated. An output value $P_{A-}$ of the photodetector 400 when the 1-A control voltage $V_{1-A}$ is decreased by dV is calculated. The 1-A control voltage $V_{1-A}$ is changed as in Equation 1 using a difference between the output values $P_{A+}$ and $P_{A-}$. In Equation 1, $\mu$ is a constant that is experimentally determined. Thereafter, the 1-C control voltage $V_{1-C}$ is changed as in Equation 1 by applying the same method to the 1-C control voltage $V_{1-C}$. If this method is sequentially repeated, an output value P of the photodetector 400 converges on a minimum value. Here, the 1-B control voltage $V_{1-B}$ is set to 0 (i.e., ground voltage).

Meanwhile, if the control voltages $V_{1-A}$ and $V_{1-C}$ continue to be changed as described above, an output value P of the photodetector 400 can have a minimum value. In order to satisfy this condition, the 1-A and the 1-C control voltages $V_{1-A}$ and $V_{1-C}$ have to be capable of being unlimitedly increased. Since the 1-A and the 1-C control voltages $V_{1-A}$ and $V_{1-c}$ cannot be unlimitedly increased practically, it is necessary to reset the 1-A and the 1-C control voltages $V_{1-A}$ and $V_{1-C}$ to values satisfying a specific condition (i.e., a condition that an angle or shape of polarized light maintains a previous angle or shape) in a predetermined condition.

The predetermined condition that the reset process enters is described below with reference to Equation 2.

$$V_{N1} = (V_{1-C} - V_{1-A} - V_{C,BIAS} + V_{A,BIAS})/V_\pi,$$

$$V_{N2} = (V_{1-C} + V_{1-A} - V_{C,BIAS} - V_{A,BIAS})/(2*V_0)$$

$$\emptyset = (V_{N1}^2 + V_{N2}^2)^{1/2}. \quad \text{(Equation 2)}$$

In Equation 2, $V_\pi$ is the amount of voltage that generates a phase difference of 180° between the TE mode and the TM mode, and $V_0$ is the amount of voltage that moves all pieces of optical power from the TE mode to the TM mode or from the TM mode to the TE mode. $V_{A,BIAS}$ and $V_{C,BIAS}$ are voltages applied to the first electrode 111_A and the third electrode 111_C of the first polarization converter 110, respectively, and are bias voltages that induce zero birefringence between the TE mode and the TM mode. Meanwhile, $V_\pi$, $V_0$, $V_{A,BIAS}$, and $V_{C,BIAS}$ may be different in the first and second polarization converters 110 and 120, and are experimentally calculated characteristic values of each of the first and second polarization converters 110 and 120. If a reset determination factor $\emptyset$ is defined as in Equation 2, the reset process is entered when a value of the reset determination factor $\emptyset$ becomes greater than 1.

The reset process is described below with reference to Equation 3.

$$dp \leftarrow dp + dpdel,$$

$$V_{N3} \leftarrow (\cos(dp)*cg - \sin(dp)*sg),$$

$$V_{N4} \leftarrow (\sin(dp)*cg + \cos(dp)*sg),$$

$$V_{1-A} \leftarrow V_0 * V_{N4} - 0.5 * V_\pi * V_{N3} + V_{A,BIAS}$$

$$V_{1-C} \leftarrow V_0 * V_{N4} + 0.5 * V_\pi * V_{N3} + V_{C,BIAS} \quad \text{(Equation 3)}$$

First, $cg = V_{N1}/\emptyset$ and $sg = V_{N2}/\emptyset$ are defined using first and second normalization voltages $V_{N1}$ and $V_{N2}$ when the reset process is entered. Here, a value of "dp" is sequentially increased up to 0-$\pi$ by dpdel. "dpdel" refers to a change step amount of "dp" and determines speed of the reset process speed. The value "dpdel" is experimentally calculated. If third and fourth normalization voltages $V_{N3}$ and $V_{N4}$ in Equation 3 are represented by coordinates, the third and fourth normalization voltages $V_{N3}$ and $V_{N4}$ move in a circle having a radius of 1. After the third and fourth normalization voltages $V_{N3}$ and $V_{N4}$ move from a point at which they have entered the reset process to an opposite location along the circle having a radius of 1, the reset process is terminated. The third and fourth normalization voltages $V_{N3}$ and $V_{N4}$ at each point are converted into the 1-A control voltage $V_{1-A}$ and the 1-C control voltage $V_{1-C}$ as in Equation 3, and are then applied to the first polarization converter 110. The 1-A control voltage $V_{1-A}$ and the 1-C control voltage $V_{1-C}$ are reset to a specific value by the reset process as described above. The specific value is capable of maintaining a polarization state (e.g., a polarization shape or a polarization angle) of the first output optical signal in the same state as that before the reset process was entered. Although the 1-A control voltage $V_{1-A}$ and the 1-C control voltage $V_{1-C}$ reset to the specific value through the reset process are applied to the first polarization converter 110 that operates again, a polarization state (e.g., a polarization shape or a polarization angle) of the first output optical signal remains constant.

Meanwhile, the reset condition and the reset process represented by Equation 2 and Equation 3 can also be represented by Equation 4 and Equation 5 below.

$$V_{N1} = V_C - V_A - V_{C,BIAS} + V_{A,BIAS}$$

$$V_{N2} = V_C + V_A - V_{C,BIAS} - V_{A,BIAS} \quad \text{(Equation 4)}$$

If the first and second normalization voltages $V_{N1}$ and $V_{N2}$ are defined as in Equation 4, the first and second normalization voltages $V_{N1}$ and $V_{N2}$ enter the reset process represented by Equation 5 when the first and second normalization voltages $V_{N1}$ and $V_{N2}$ deviate from an ellipse, that is, $V_{N1}^2/V_\pi^2 + V_{N2}^2/2*V_0^2 = 1$.

$$dp \leftarrow dp + dpdel,$$

$$V_{N3} \leftarrow (\cos(dp)*cg - \sin(dp)*sg*V_\pi/(2*V_0)),$$

$$V_{N4} \leftarrow (\sin(dp)*cg*(2*V_0)/V_\pi + \cos(dp)*sg),$$

$$V_{1-A} \leftarrow -0.5*V_{N4} - 0.5*V_{N3} + V_{A,BIAS}.$$

$$V_{1-C} \leftarrow -0.5*V_{N4} + 0.5*V_{N3} + V_{C,BIAS}. \quad \text{(Equation 5)}$$

First, $cg=V_{N1}$ and $sg=V_{N2}$ are defined using the first and the second normalization voltages $V_{N1}$ and $V_{N2}$ when the first and the second normalization voltages $V_{N1}$ and $V_{N2}$ enter the reset process. Here, coordinates represented by the third and fourth normalization voltages $V_{N3}$ and $V_{N4}$ move from a point at which the third and fourth normalization voltages $V_{N3}$ and $V_{N4}$ first entered the reset process to a directly opposite point on the ellipse. Meanwhile, the reset process represented by Equation 4 and Equation 5 is the same as the reset process represented by Equation 2 and Equation 3.

Meanwhile, the control and reset process of the first control voltages $V_{1-A}$, $V_{1-B}$, and $V_{1-C}$ applied to the first polarization converter 110 have been described so far, but the control and reset process of the second control voltages $V_{2-A}$, $V_{2-B}$, and $V_{2-C}$ applied to the second polarization converter 120 are the same as the above-described control and reset process.

Meanwhile, since each of the first control voltages $V_{1-A}$ and $V_{1-C}$ and the second control voltages $V_{2-A}$ and $V_{2-C}$ requires a reset process as described above, a polarization control operation using one of the first and second polarization converters 110 and 120 may be performed while the reset process is performed on control voltages applied to the other of the first and second polarization converters 110 and 120. For example, while the reset process is performed on the 1-A and the 1-C control voltages $V_{1-A}$ and $V_{1-C}$ applied to the first polarization converter 110, the conversion operation of the first polarization converter 110 is stopped and the second polarization converter 120 performs its conversion operation using the second control voltages $V_{2-A}$, $V_{2-B}$, and $V_{2-C}$. Furthermore, when the 2-A and the 2-C control voltages $V_{2-A}$ and $V_{2-C}$ reach a threshold value (i.e., the reset condition is satisfied), the reset process is performed on the 2-A and the 2-C control voltages $V_{2-A}$ and $V_{2-C}$. In this case, the conversion operation of the second polarization converter 120 is stopped, and the first polarization converter 110 performs its conversion operation again using the first control voltages $V_{1-A}$, $V_{1-B}$, and $V_{1-C}$.

Figure 3:
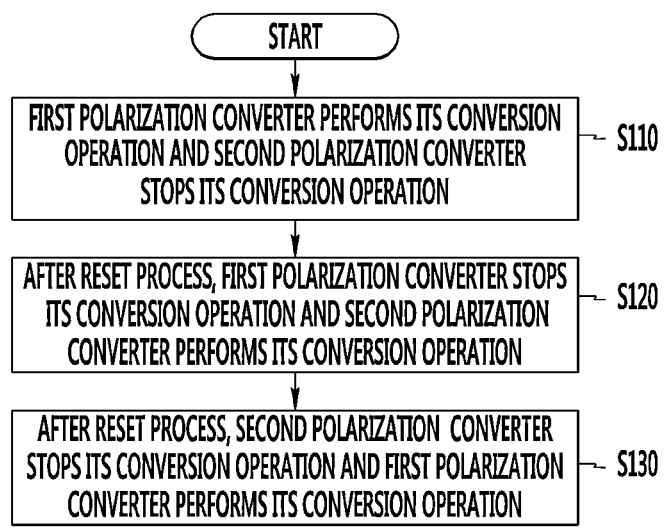
FIG. 3 is a flowchart illustrating the operation of a first polarization converter 110 and a second polarization converter 120 shown in FIG. 1.

FIG. 3 is a flowchart illustrating the operation of the first polarization converter 110 and the second polarization converter 120 shown in FIG. 1.

First, when the first polarization converter 110 performs its conversion operation using the first control voltages $V_{1-A}$, $V_{1-B}$, and $V_{1-C}$, the conversion operation of the second polarization converter 120 is stopped at step S110. When the 1-A and the 1-C control voltages $V_{1-A}$ and $V_{1-C}$ reach a threshold value (i.e., the reset condition is satisfied), a reset process is performed on the 1-A and the 1-C control voltages $V_{1-A}$ and $V_{1-C}$. In this case, the conversion operation of the first polarization converter 110 is stopped, and instead the second polarization converter 120 performs its conversion operation at step S120. Furthermore, when the second polarization converter 120 operates and a reset process is then performed on the 2-A and the 2-C control voltages $V_{2-A}$ and $V_{2-C}$) the conversion operation of the second polarization converter 120 is stopped and the first polarization converter 110 performs its conversion operation again at step S130. The first and second polarization converters 110 and 120 operate repeatedly in the same manner.

Meanwhile, an optical signal after passing through the first polarization converter 110 or the second polarization converter 120 has a circular polarization state. The third polarization converter 130 converts the optical signal having the circular polarization state into an optical signal having a linear polarization state using the third control voltages $V_{3-A}$, $V_{3-B}$, and $V_{3-C}$, that is, fixed DC voltages defined as in Equation 6 below. The third control voltages $V_{3-A}$, $V_{3-B}$, and $V_{3-C}$ are supplied from the controller 500.

$$V_{3-A} = \pm V_0/2 + V_{A,BIAS}$$

$$V_{3-C} = \pm V_0/2 + V_{C,BIAS}$$

$$V_{3-B} = 0. \quad \text{(Equation 6)}$$

Figure 4:
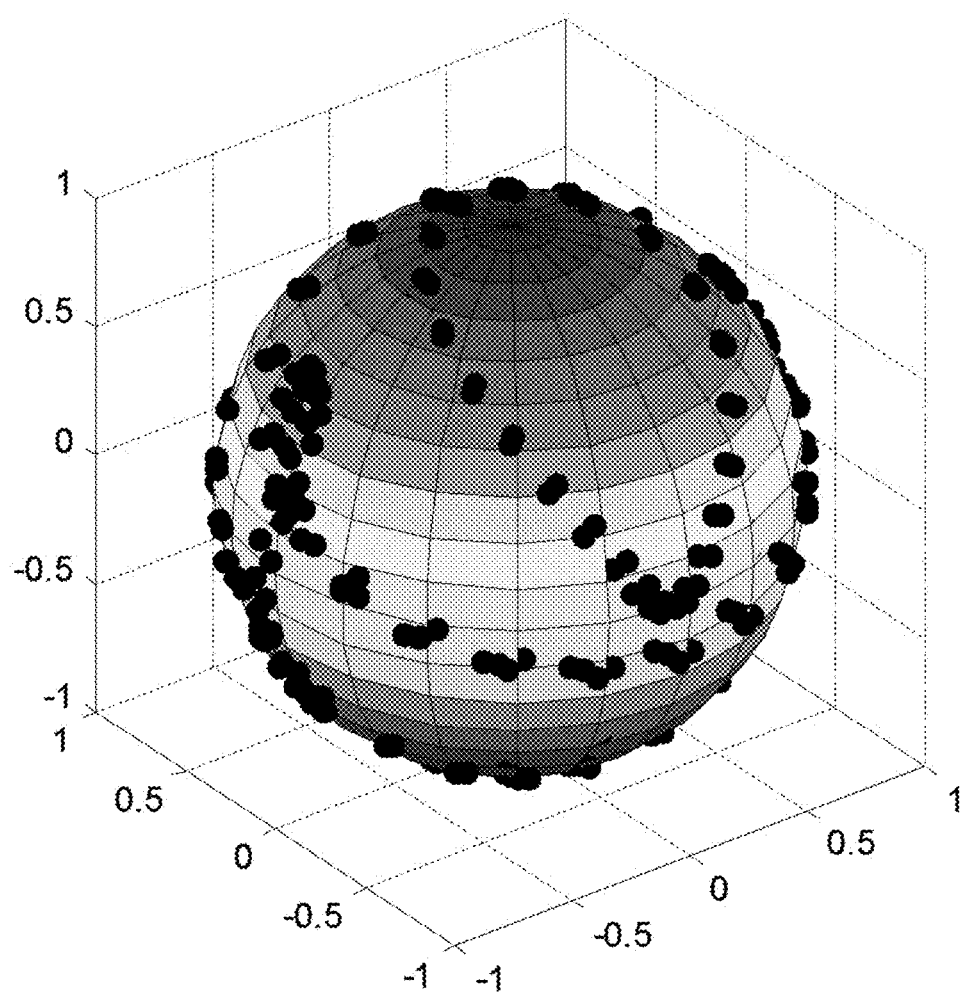
FIG. 4 illustrates polarization states of an input optical signal that are converted over time on a Poincare sphere.
Figure 5:
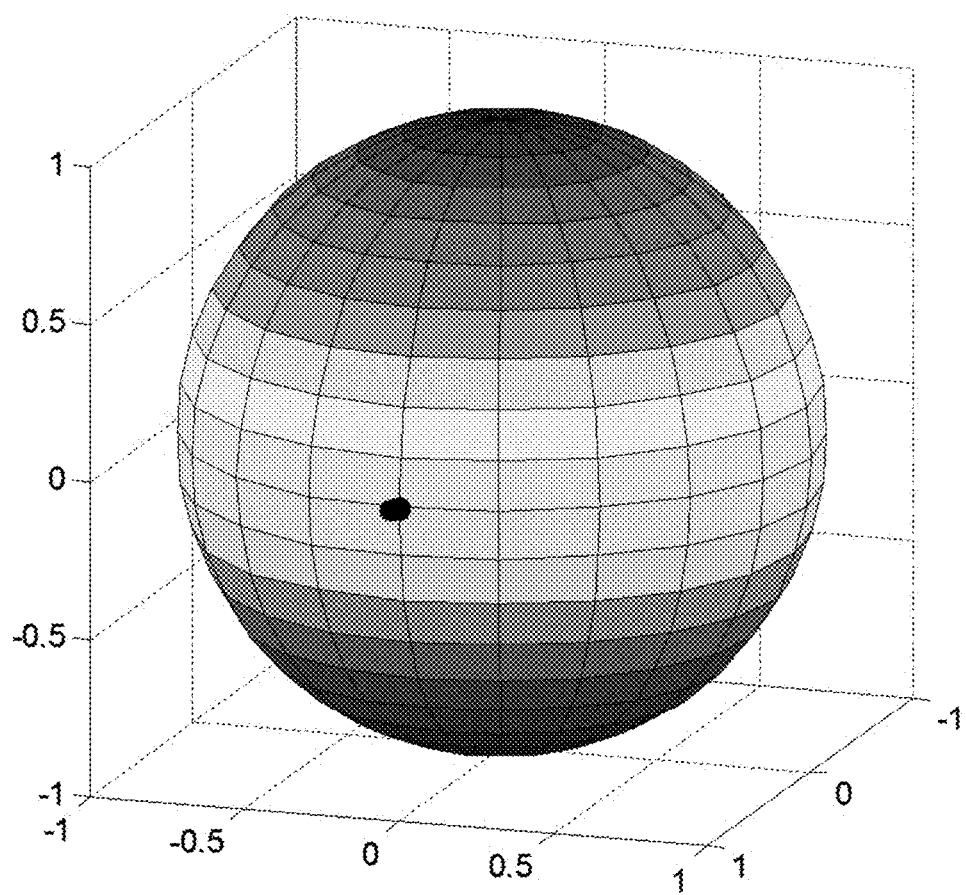
FIG. 5 illustrates polarization states that are regularly maintained by a polarization control method of the present invention on a Poincare sphere.

The operation and results of the polarization control device according to computer simulations using the polarization control algorithm described so far are described below with reference to FIGS. 4 and 5. FIG. 4 illustrates polarization states of an input optical signal that are converted over time on a Poincare sphere, and FIG. 5 illustrate polarization states that are regularly maintained by a polarization control method of the present invention on a Poincare sphere. From FIG. 4, it can be seen that the polarization state of the input optical signal is changed over time. Here, the polarization state of the input optical signal is indicated by one point on the Poincare sphere, and a movement of this point represents a change in the polarization state of the optical signal. From FIG. 5, it can be seen that the polarization states of an output optical signal obtained by the above-described polarization control algorithm remain constant.

Figure 6A:
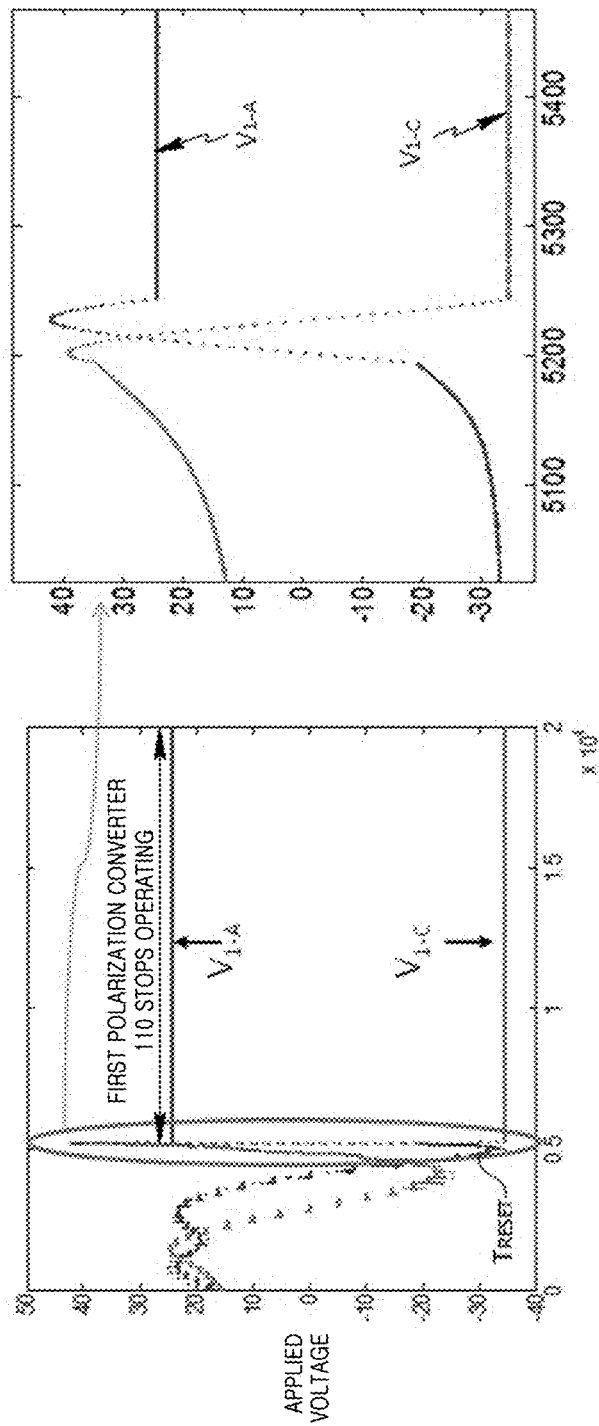
FIGS. 6A and 6B are diagrams showing a change of first control voltages $V_{1-A}$ and $V_{1-C}$ and second control voltages $V_{1-A}$ and $V_{1-C}$ through a reset process. More particularly.
Figure 6B:
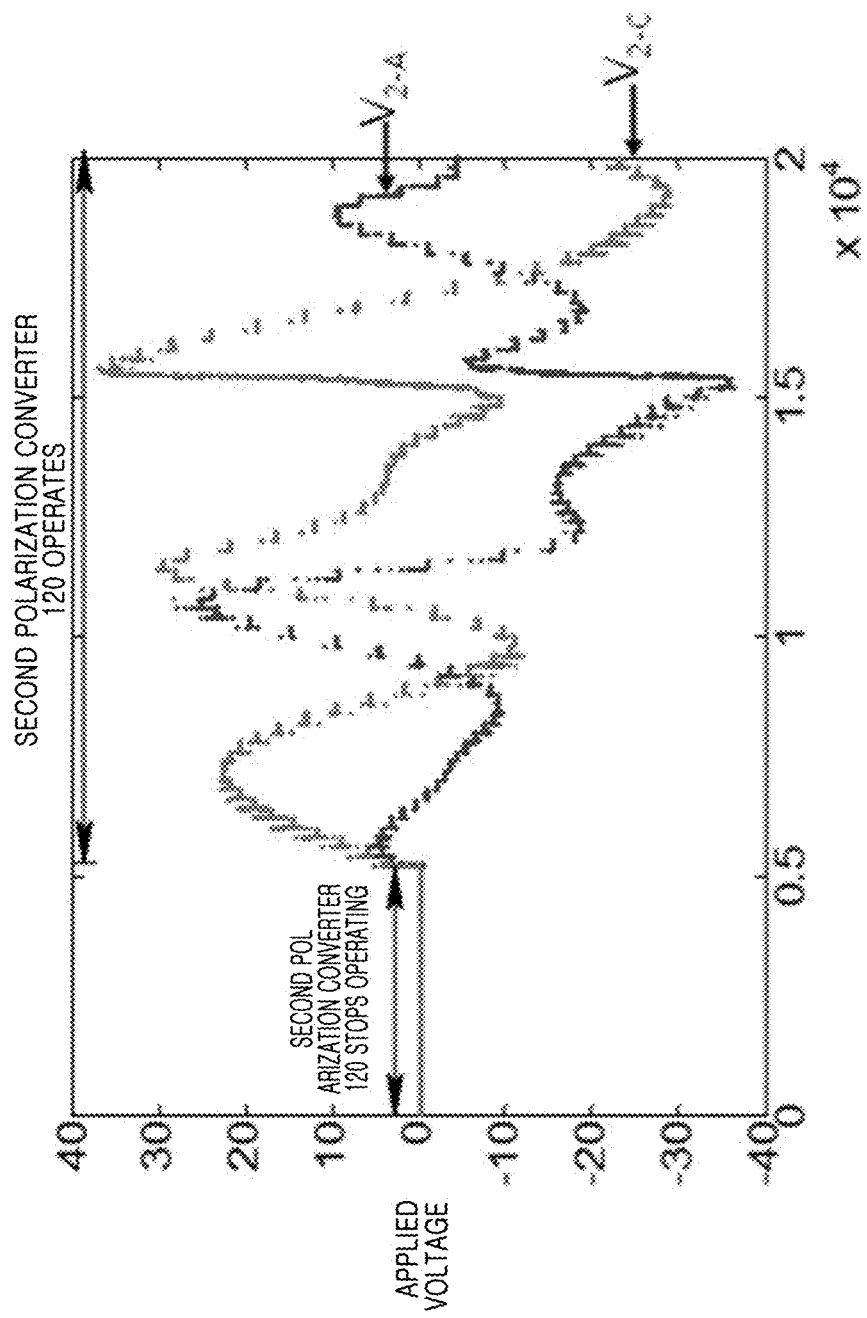

FIGS. 6A and 6B are diagrams showing a change of first control voltages $V_{1-A}$ and $V_{1-C}$ and second control voltages $V_{1-A}$ and $V_{1-C}$ through a reset process. More particularly, FIG. 6A shows a change of the first control voltages $V_{1-A}$ and $V_{1-C}$ applied to the first polarization converter 110, and FIG. 6B shows a change of the second control voltages $V_{2-A}$ and $V_{2-C}$ applied to the second polarization converter 120. As described above, it can be seen that the control voltages applied to each of the first polarization converter 110 and the second polarization converter 120 are changed when the first polarization converter 110 and the second polarization converter 120 alternately perform their conversion operations based on a point $T_{RESET}$ at which the control voltages enter a reset process.

Figure 7:
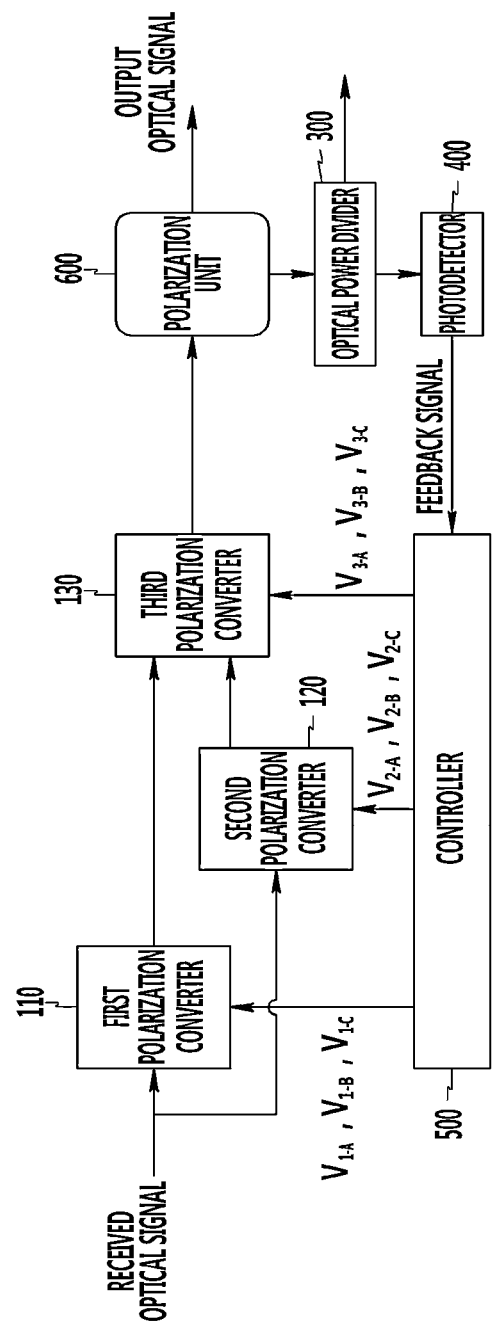
FIG. 7 is a diagram showing a polarization control device in accordance with a second exemplary embodiment of the present invention.

FIG. 7 is a diagram showing a polarization control device in accordance with a second exemplary embodiment of the present invention. The polarization control device of FIG. 7 includes a polarization divider 600 instead of the polarization unit 200 of the polarization control device shown in FIG. 1. A difference between the polarization control device of FIG. 7 and the polarization control device of FIG. 1 is chiefly described below.

The polarization divider 600 divides a first output optical signal, received from the third polarization converter 130, into two optical signals. The two optical signals have polarization states that are perpendicular to each other.

An optical power divider 300 divides the power of some of the output optical signals received from the polarization divider 600 and outputs the divided power to the photodetector 400.

Figure 8:
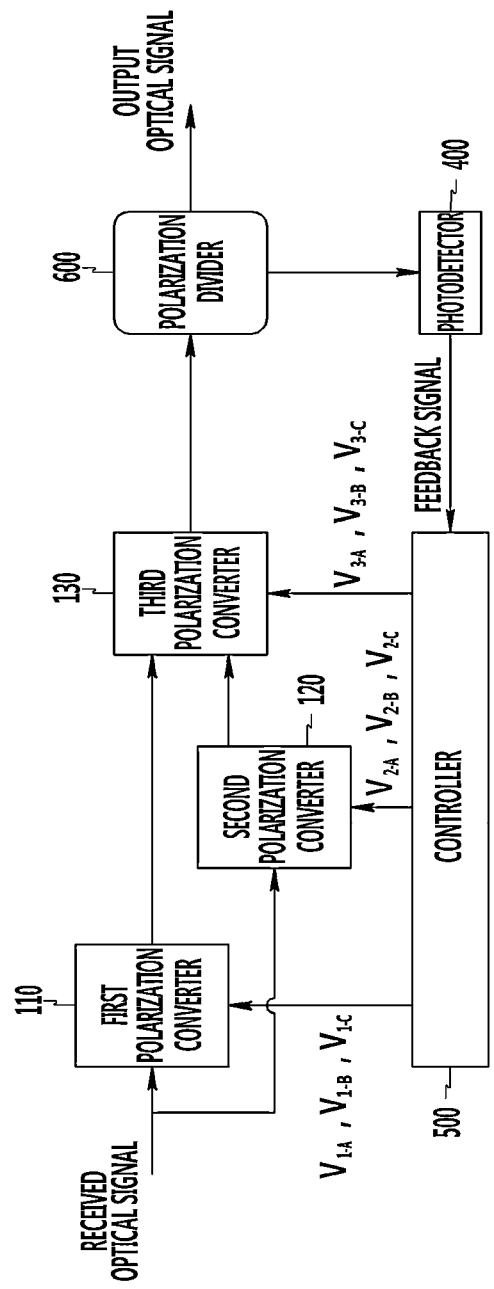
FIG. 8 is a diagram showing a polarization control device in accordance with a third exemplary embodiment of the present invention.

FIG. 8 is a diagram showing a polarization control device in accordance with a third exemplary embodiment of the present invention. As shown in FIG. 8, the polarization control device can be designed without the optical power divider 300 of the polarization control device shown in FIG. 7. The polarization control device of FIG. 8 is designed so that the photodetector 400 detects all output optical signals received from the polarization divider 600 without optical power division.

Figure 9:
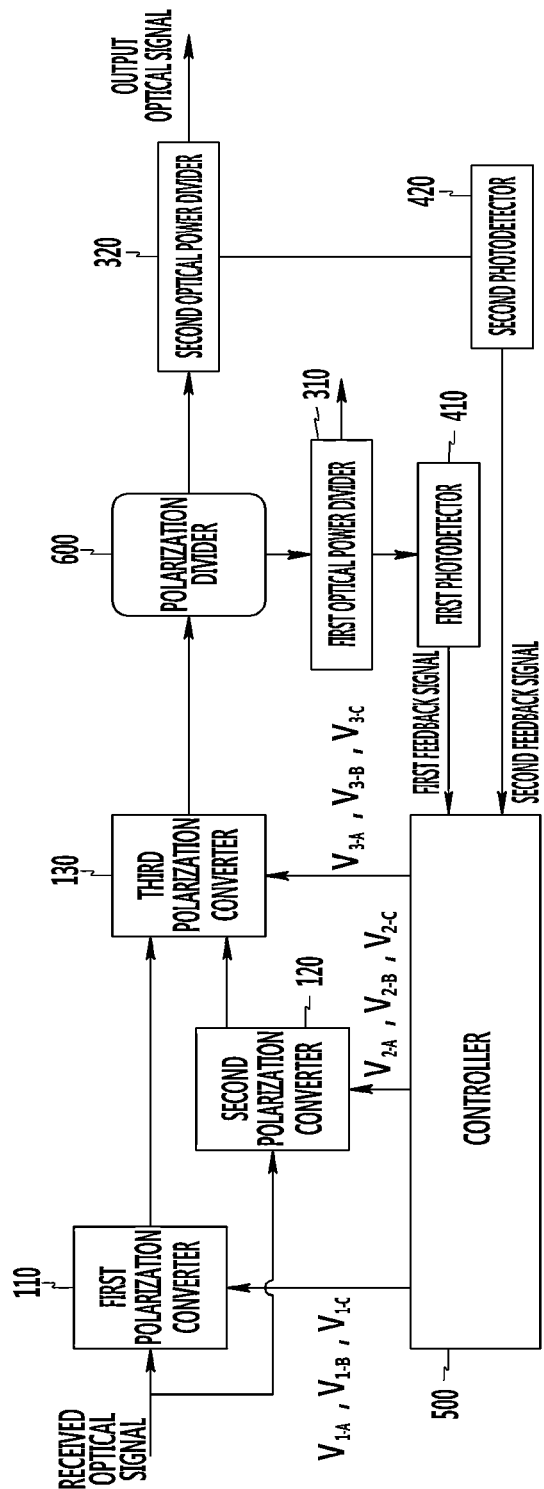
FIG. 9 is a diagram showing a polarization control device in accordance with a fourth exemplary embodiment of the present invention.

FIG. 9 is a diagram showing a polarization control device in accordance with a fourth exemplary embodiment of the present invention. The polarization control device of FIG. 9 further includes one optical power divider and one photodetector in the construction of the polarization control device shown in FIG. 7. A difference between the polarization control device of FIG. 9 and the polarization control device of FIG. 7 is chiefly described below.

One (hereinafter, a "2-1 output optical signal") of the output optical signals of the polarization divider 600 is inputted to a first optical power divider 310, and the other (hereinafter, a "2-2 output optical signal") thereof is inputted to a second optical power divider 320. The first optical power divider 310 divides the optical power of the 2-1 output optical signal and outputs the divided optical power to a first photodetector 410. The second optical power divider 320 divides the optical power of the 2-2 output optical signal and outputs the divided optical power to a second photodetector 420.

The first photodetector 410 detects the power of the optical signal received from the first optical power divider 310 and outputs a first feedback signal, corresponding to the detected power, to the controller 500. The second photodetector 420 detects the power of the optical signal received from the second optical power divider 320 and a second feedback signal, corresponding to the detected power, to the controller 500.

The controller 500 controls the first control voltages $V_{1-A}$, $V_{1-B}$, and $V_{1-C}$ or the second control voltages $V_{2-A}$, $V_{2-B}$, and $V_{2-C}$ in response to the two feedback signals.

Meanwhile, the polarization control method of each of the polarization control devices shown in FIGS. 7 to 9 can be implemented based on the polarization control method (or polarization control algorithm) described with reference to FIG. 1.

Figure 10:
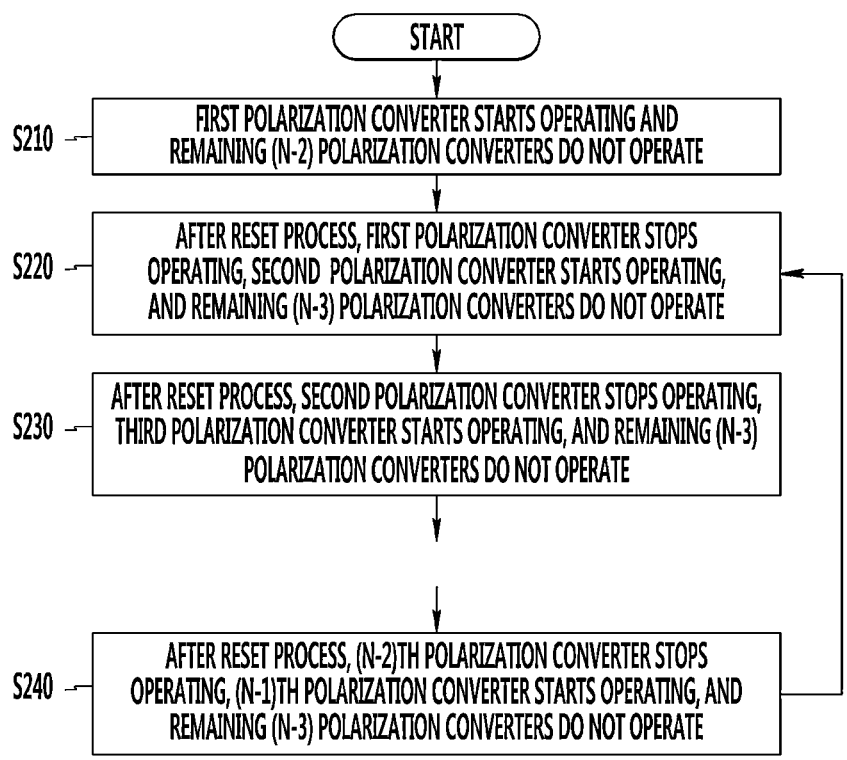
FIG. 10 is a flowchart illustrating part of the polarization control operation of a polarization control device including N polarization converters.

Meanwhile, the polarization control device including the three polarization converters 110 to 130 has been described so far, but this is only exemplary. The polarization control method in accordance with an exemplary embodiment of the present invention can also be applied to a polarization control device including four or more polarization converters, that is, N (N≥3) polarization converters. FIG. 10 is a flowchart illustrating part of the polarization control operation of a polarization control device including N polarization converters. An $N^{th}$ polarization converter performs the same function as the third polarization converter 130 of FIG. 1. That is, the $N^{th}$ polarization converter converts the polarization states of optical signals, received from first to $(N-1)^{th}$ polarization converters, into linear polarization states. A sequence of the operations of the first to $(N-1)^{th}$ polarization converters is described below with reference to FIG. 10.

First, the first polarization converter performs its conversion operation, and the remaining (N−2) polarization converters stop their conversion operations at step S210. When a reset process is performed on control voltages applied to the first polarization converter, the conversion operation of the first polarization converter is stopped, the conversion operation of the second polarization converter is performed, and the conversion operations of the remaining (N−3) polarization converters are stopped at step S220. When a reset process is performed on control voltages applied to the second polarization converter, the conversion operation of the second polarization converter is stopped, the conversion operation of the third polarization converter is performed, and the conversion operations of the remaining (N−3) polarization converters are stopped at step S230. When a reset process is performed on control voltages applied to a $(N-2)^{th}$ polarization converter, the conversion operation of the $(N-2)^{th}$ polarization converter is stopped, the conversion operation of an $(N-1)^{th}$ polarization converter is performed, and the conversion operations of the remaining (N−3) polarization converters are stopped at step S240. Furthermore, when a reset process is performed on control voltages applied to an $(N-1)^{th}$ polarization converter, the conversion operation of the $(N-1)^{th}$ polarization converter is stopped, the conversion operation of the first polarization converter is performed, and the conversion operations of the remaining (N−3) polarization converters are stopped. The above process is repeatedly performed.

Operating speed of the polarization control device can be improved when a plurality of the polarization converters are used as in FIG. 10.

In accordance with an exemplary embodiment of the present invention, the operation of an optical communication system or a photo sensor system can be stabilized by regularly maintaining a polarization state of a received optical signal.

Furthermore, high-speed control and stable polarization control are possible using a polarization converter based on a lithium niobate (LiNb03) wave guide.

Furthermore, a polarization control method (or polarization control algorithm) in accordance with an exemplary embodiment of the present invention can be easily applied to a polarization control device including a plurality of polarization converters.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A polarization control device, comprising:
   a first polarization converter for converting a polarization angle of an input optical signal in response to first control voltages;
   a second polarization converter for converting a polarization angle of the input optical signal in response to second control voltages;
   a third polarization converter for converting an optical signal received from the first polarization converter or the second polarization converter into a first output optical signal having a linear polarization state and outputting the first output optical signal;
   a polarization unit for controlling power of the first output optical signal;
   a photodetector for detecting power of the optical signal received from the polarization unit and outputting a feedback signal corresponding to the detected power; and
   a controller for controlling intensity of the first control voltages or the second control voltages in response to the feedback signal and resetting the first control voltages or the second control voltages when the first control voltages or the second control voltages reach a threshold value, wherein, when the first control voltages are reset, the first polarization converter stops its conversion operation and the second polarization converter starts its conversion operation, when the second control voltages are reset, the second polarization converter stops its conversion operation and the first polarization converter starts its conversion operation, the first control voltages comprise a first voltage applied to the first electrode of the first polarization converter, a second voltage applied to the second electrode of the first polarization converter, and a third voltage applied to the third electrode of the first polarization converter, the first voltage and the third voltage are varied in response to the feedback signal, and the second voltage is a ground voltage; and the second control voltages comprise a fourth voltage applied to the first electrode of the second polarization converter, a fifth voltage applied to the second electrode of the second polarization converter, and a sixth voltage applied to the third electrode of the second polarization converter, the fourth voltage and the sixth voltage are varied in response to the feedback signal, and the fifth voltage is a ground voltage.

2. The polarization control device of claim 1, wherein:

the polarization unit controls the power of the first output optical signal based on a difference between its own unique polarization angle and a polarization angle of the first output optical signal;

the polarization control device further comprises an optical power divider for dividing the power of the optical signal received from the polarization unit and outputting part of the divided power to the photodetector; and the photodetector detects the power of the optical signal received from the optical power divider and outputs the feedback signal corresponding to the detected power.

3. The polarization control device of claim 1, wherein each of the first polarization converter, the second polarization converter, and the third polarization converter is configured to comprise a first electrode, a second electrode, and a third electrode, respectively, and is based on a lithium niobate (LiNbO$_3$) wave guide.

4. The polarization control device of claim 3, wherein the third polarization converter converts a shape of polarization into a shape of linear polarization using fixed DC voltages supplied from the controller.

5. The polarization control device of claim 4, wherein:

the controller applies a seventh voltage, defined by Equation 7, to the first electrode of the third polarization converter, applies an eighth voltage that is a ground voltage to the second electrode of the third polarization converter, and applies a ninth voltage, defined by Equation 8, to the third electrode of the third polarization converter; and the third polarization converter converts a shape of polarization into linear polarization using the seventh voltage, the eighth voltage, and the ninth voltage:

$$V_{3\text{-}A} = \pm V_{3\text{-}0}/2 + V_{3\text{-}A,BIAS} \quad \text{[Equation 7]}$$

($V_{3\text{-}A}$ is the seventh voltage, $V_{3\text{-}0}$ is a voltage for the third polarization converter and a voltage that moves all pieces of optical power from TE mode to TM mode or from TM mode to TE mode, and $V_{3\text{-}A,BIAS}$ is a bias voltage that is applied to the first electrode of the third polarization converter and that induces zero birefringence between the TE mode and the TM mode);

$$V_{3\text{-}C} = \pm V_{3\text{-}0}/2 + V_{3\text{-}C,BIAS} \quad \text{[Equation 8]}$$

($V_{3\text{-}C}$ is the ninth voltage, and $V_{3\text{-}C,BIAS}$ is a bias voltage that is applied to the third electrode of the third polarization converter and that induces zero birefringence between the TE mode and the TM mode).

6. The polarization control device of claim 1, wherein:

the controller control the first voltage as in Equation 1, controls the third voltage as in Equation 2, and applies the controlled first and third voltages to the first polarization converter; and the controller controls the fourth voltage as in Equation 1, controls the sixth voltage as in Equation 2, and applies the controlled fourth and sixth voltages to the second polarization converter:

$$V_A \leftarrow V_A + \mu^*(P_{A+} - P_{A-})/(2^*dV) \quad \text{[Equation 1]}$$

($V_A$: the first voltage or the fourth voltage, $\mu$: an experimentally determined constant, dV: a change of a voltage for dithering, $P_{A+}$: a value of the feedback signal outputted from the photodetector when a voltage $V_A + dV$ is applied to the first polarization converter or the second polarization converter, and $P_{A-}$: a value of the feedback signal outputted from the photodetector when a voltage $V_A - dV$ is applied to the first polarization converter or the second polarization converter);

$$V_C \leftarrow V_C + \mu^*(P_{C+} - P_{C-})/(2^*dN) \quad \text{[Equation 2]}$$

($V_C$: the third voltage or the sixth voltage, $P_{C+}$: a value of the feedback signal outputted from the photodetector when a voltage $V_C + dV$ is applied to the first polarization converter or the second polarization converter, and $P_{C-}$: a value of the feedback signal outputted from the photodetector when a voltage $V_C - dV$ is applied to the first polarization converter or the second polarization converter).

7. The polarization control device of claim 6, wherein the controller resets the first voltage and the third voltage when a value of a first reset determination factor $\varnothing_1$ defined as in Equation 3 is greater than 1:

$$V_{N1\text{-}1} = (V_{1\text{-}C} - V_{1\text{-}A} - V_{C,BIAS} + V_{A,BIAS})/V_{1\text{-}\pi},$$

$$V_{N1\text{-}2} = (V_{1\text{-}C} + V_{1\text{-}A} - V_{C,BIAS} - V_{A,BIAS})/(2^*V_{1\text{-}0})$$

$$\varnothing_1 = (V_{N1\text{-}1}^2 + V_{N1\text{-}2}^2)^{1/2}. \quad \text{[Equation 3]}$$

($\varnothing_1$ is the first reset determination factor, $V_{N1\text{-}1}$ and $V_{N1\text{-}2}$ are normalization voltages, $V_{1\text{-}A}$ is the first voltage, $V_{1\text{-}C}$ is the third voltage, $V_{1\text{-}\pi}$ is a voltage for the first polarization converter and a voltage having a magnitude that generates a phase difference of 180° between a TE mode and a TM mode, $V_{1\text{-}0}$ is a voltage for the first polarization converter and a voltage having a magnitude that moves all pieces of optical power from the TE mode to the TM mode or from the TM mode to the TE mode, and $V_{1\text{-}A,BIAS}$ and $V_{1\text{-}C,BIAS}$ are bias voltages that are applied to the first electrode and the third electrode of the first polarization converter, respectively, and that induce zero birefringence between the TE mode and the TM mode).

8. The polarization control device of claim 7, wherein the controller resets the fourth voltage and the sixth voltage when a value of a second reset determination factor $\varnothing_2$ defined as in Equation 4 is greater than 1:

$$V_{N2\text{-}1} = (V_{2\text{-}C} - V_{2\text{-}A} - V_{2\text{-}C,BIAS} + V_{2\text{-}A,BIAS})/V_{2\text{-}\pi},$$

$$V_{N2\text{-}2} = (V_{2\text{-}C} + V_{2\text{-}A} - V_{2\text{-}C,BIAS} - V_{2\text{-}A,BIAS})/(2^*V_{2\text{-}0})$$

$$\varnothing_2 = (V_{N2\text{-}1}^2 + V_{N2\text{-}2}^2)^{1/2}. \quad \text{[Equation 4]}$$

($Ø_2$ is the second reset determination factor, $V_{N2-1}$ and $V_{N2-2}$ are normalization voltages, $V_{2-A}$ is the fourth voltage, $V_{2-C}$ is the sixth voltage, $V_{2-\pi}$ is a voltage for the second polarization converter and a voltage having an amount that generates a phase difference of 180° between the TE mode and the TM mode, $V_{2-0}$ is a voltage for the second polarization converter and a voltage having a magnitude that moves all pieces of optical power from the TE mode to the TM mode or from the TM mode to the TE mode, and $V_{2-A,BIAS}$ and $V_{2-C,BIAS}$ are bias voltages that are applied to the first electrode and the third electrode of the second polarization converter, respectively, and that induce zero birefringence between the TE mode and the TM mode).

9. The polarization control device of claim 8, wherein the controller resets the first voltage and the third voltage through a reset process defined as in Equation 5:

$$dp \leftarrow dp + dpdel,$$
$$V_{N1-3} \leftarrow (\cos(dp)*cg_1 - \sin(dp)*sg_1),$$
$$V_{N1-4} \leftarrow (\sin(dp)*cg_1 + \cos(dp)*sg_1),$$
$$V_{1-A} \leftarrow V_{1-0}*V_{N1-4} - 0.5*V_{1-\pi}*V_{N1-3} + V_{A,BIAS}$$
$$V_{1-C} \leftarrow V_{1-0}*V_{N1-4} + 0.5*V_{1-\pi}*V_{N1-3} + V_{1-C,BIAS} \quad [\text{Equation 5}]$$

(dp: a parameter sequentially increased up to 0-$\pi$ by dpdel, dpdel: a step amount of a change of dp, a value that determines speed of the reset process, and an experimentally calculated value, $V_{N1-3}$ and $V_{N1-4}$: normalization voltages, $cg_1$: a constant having a value obtained by dividing the normalization voltage $V_{N1-1}$ when the reset process is entered by a value of the first reset determination factor $Ø_1$, and $sg_1$: a constant having a value obtained by dividing the normalization voltage $V_{N1-2}$ when the reset process is entered by a value of the first reset determination factor $Ø_1$).

10. The polarization control device of claim 9, wherein the controller resets the fourth voltage and the sixth voltage through a reset process defined as in Equation 6:

$$dp \leftarrow dp + dpdel,$$
$$V_{N2-3} \leftarrow (\cos(dp)*cg_2 - \sin(dp)*sg_2),$$
$$V_{N2-4} \leftarrow (\sin(dp)*cg_2 + \cos(dp)*sg_2),$$
$$V_{2-A} \leftarrow V_{2-0}*V_{N2-4} - 0.5*V_{2-\pi}*V_{N2-3} + V_{2-A,BIAS}$$
$$V_{2-C} \leftarrow V_{2-0}*V_{N2-4} + 0.5*V_{2-\pi}*V_{N2-3} + V_{2-C,BIAS} \quad [\text{Equation 6}]$$

($V_{N2-3}$, $V_{N2-4}$: normalization voltages, $cg_2$: a constant having a value obtained by dividing the normalization voltage $V_{N2-1}$ when the reset process is entered by a value of the second reset determination factor $Ø_2$, and $sg_2$: a constant having a value obtained by dividing the normalization voltage $V_{N2-2}$ when the reset process is entered by a value of the second reset determination factor $Ø_2$).

11. A polarization control device, comprising:
a first polarization converter converting a polarization angle of an input optical signal in response to first control voltages;
a second polarization converter converting a polarization angle of the input optical signal in response to second control voltages;
a third polarization converter selectively receiving an intermediate optical signal from the first polarization converter or the second polarization converter and converting the intermediate optical signal into a first output optical signal having a linear polarization state and outputting the first output optical signal;
a polarization unit for controlling power of the first output optical signal;
a photodetector for detecting power of the optical signal received from the polarization unit and outputting a feedback signal corresponding to the detected power; and
a controller for controlling intensity of the first control voltages or the second control voltages in response to the feedback signal and resetting the first control voltages or the second control voltages when the first control voltages or the second control voltages reach a threshold value; wherein, when the first control voltages are reset, the first polarization converter stops its conversion operation and the second polarization converter starts its conversion operation, and when the second control voltages are reset, the second polarization converter stops its conversion operation and the first polarization converter starts its conversion operation; the controller applies a seventh voltage, defined by [Equation 7], to the first electrode of the third polarization converter, applies an eighth voltage that is a ground voltage to the second electrode of the third polarization converter, and applies a ninth voltage, defined by Equation 8, to the third electrode of the third polarization converter; and the third polarization converter converts a shape of polarization into linear polarization using the seventh voltage, the eighth voltage, and the ninth voltage:

$$V_{3-A} = \pm V_{3-0}/2 + V_{3-A,BIAS} \quad [\text{Equation 7}]$$

(V3-A is the seventh voltage, V3-o is a voltage for the third polarization converter and a voltage that moves all pieces of optical power from TE mode to TM mode or from TM mode to TE mode, and V3-A, BIAS is a bias voltage that is applied to the first electrode of the third polarization converter and that induces zero birefringence between the TE mode and the TM mode);

$$V_{3-C} = \pm V_{3-0}/2 + V_{3-C,BIAS} \quad [\text{Equation 8}]$$

(V3-c is the ninth voltage, and V3.C,BIAS is a bias voltage that is applied to the third electrode of the third polarization converter and that induces zero birefringence between the TE mode and the TM mode).

12. The polarization control device of claim 11, wherein:
the polarization unit controls the power of the first output optical signal based on a difference between its own unique polarization angle and a polarization angle of the first output optical signal;
the polarization control device further comprises an optical power divider for dividing the power of the optical signal received from the polarization unit and outputting part of the divided power to the photodetector; and
the photodetector detects the power of the optical signal received from the optical power divider and outputs the feedback signal corresponding to the detected power.

13. The polarization control device of claim 11, wherein each of the first polarization converter, the second polarization converter, and the third polarization converter is configured to comprise a first electrode, a second electrode, and a third electrode, respectively, and is based on a lithium niobate ($LiNbO_3$) wave guide.

14. The polarization control device of claim 13, wherein:
the first control voltages comprise a first voltage applied to the first electrode of the first polarization converter, a second voltage applied to the second electrode of the first polarization converter, and a third voltage applied to the third electrode of the first polarization converter, the first voltage and the third voltage are varied in response to the feedback signal, and the second voltage is a ground voltage; and the second control voltages comprise a fourth voltage applied to the first electrode of the second polarization converter, a fifth voltage applied to the second electrode of the second polarization converter, and a sixth voltage applied to the third electrode of the second polarization converter, the fourth voltage and the sixth voltage are varied in response to the feedback signal, and the fifth voltage is a ground voltage.

15. The polarization control device of claim 13, wherein the third polarization converter converts a shape of polarization into a shape of linear polarization using fixed DC voltages supplied from the controller.

16. The polarization control device of claim 14, wherein:
the controller control the first voltage as in Equation 1, controls the third voltage as in Equation 2, and applies the controlled first and third voltages to the first polarization converter; and the controller controls the fourth voltage as in Equation 1, controls the sixth voltage as in Equation 2, and applies the controlled fourth and sixth voltages to the second polarization converter:

$$V_A \leftarrow V_A + \mu * (P_{A+} - P_{A-})/(2*dV) \qquad \text{[Equation 1]}$$

($V_A$: the first voltage or the fourth voltage, $\mu$: an experimentally determined constant, dV: a change of a voltage for dithering, $P_{A+}$: a value of the feedback signal outputted from the photodetector when a voltage $V_A$ +dV is applied to the first polarization converter or the second polarization converter, and $P_{A-}$: a value of the feedback signal outputted from the photodetector when a voltage $V_A$-dV is applied to the first polarization converter or the second polarization converter);

$$V_C \leftarrow V_C + \mu * (P_{C+} - P_{C-})/(2*dV) \qquad \text{[Equation 2]}$$

($V_C$: the third voltage or the sixth voltage, $P_{C+}$: a value of the feedback signal outputted from the photodetector when a voltage $V_C$+dV is applied to the first polarization converter or the second polarization converter, and $P_{C-}$: a value of the feedback signal outputted from the photodetector when a voltage $V_C$ - dV is applied to the first polarization converter or the second polarization converter).

17. The polarization control device of claim 16, wherein the controller resets the first voltage and the third voltage when a value of a first reset determination factor $Ø_1$ defined as in Equation 3 is greater than 1:

$$V_{N1-1} = (V_{1-C} - V_{1-A} - V_{1-C,BIAS} + V_{1-A,BIAS})/V_{1-\pi}$$

$$V_{N1-2} = (V_{1-C} + V_{1-A} - V_{1-C,BIAS} - V_{1-A,bias})/(2*V_{1-0})$$

$$Ø_1 = (V_{N1-1}^2 + V_{N1-2}^2)^{1/2} \qquad \text{[Equation 3]}$$

($Ø_1$ is the first reset determination factor, $V_{N1-1}$ and $V_{N1-2}$ are normalization voltages, $V_{1-A}$ is the first voltage, $V_{1-C}$ is the third voltage, $V_{1-\pi}$ is a voltage for the first polarization converter and a voltage having a magnitude that generates a phase difference of 180° between a TE mode and a TM mode, $V_{1-0}$ is a voltage for the first polarization converter and a voltage having a magnitude that moves all pieces of optical power from the TE mode to the TM mode or from the TM mode to the TE mode, and $V_{1-A,BIAS}$ and $V_{1-C,BIAS}$ are bias voltages that are applied to the first electrode and the third electrode of the first polarization converter, respectively, and that induce zero birefringence between the TE mode and the TM mode).

18. The polarization control device of claim 17, wherein the controller resets the fourth voltage and the sixth voltage when a value of a second reset determination factor $Ø_2$ defined as in Equation 4 is greater than 1:

$$V_{N2-1} = (V_{2-C} - V_{2-A} - V_{2-C,BIAS} = V_{2-A,BIAS})/V_{2-\pi}$$

$$V_{N2-2} = (V_{2-C} V_{2-A} - V_{2-C,BIAS} - V_{2-A,BIAS})/(2*V_{2-0})$$

$$Ø_2 = (V_{N2-1}^2)^{1/2} \qquad \text{[Equation 4]}$$

($Ø_2$ is the second reset determination factor, $V_{N2-1}$ and $V_{N2-2}$ are normalization voltages, $V_{2-A}$ is the fourth voltage, $V_{2-C}$ is the sixth voltage, $V_{2-\pi}$ is a voltage for the second polarization converter and a voltage having an amount that generates a phase difference of 180° between the TE mode and the TM mode, $V_{2-0}$ is a voltage for the second polarization converter and a voltage having a magnitude that moves all pieces of optical power from the TE mode to the TM mode or from the TM mode to the TE mode, and $V_{2-A,BIAS}$ and $V_{2-C,BIAS}$ are bias voltages that are applied to the first electrode and the third electrode of the second polarization converter, respectively, and that induce zero birefringence between the TE mode and the TM mode).

\* \* \* \* \*